United States Patent
Croutwater et al.

(10) Patent No.: US 11,361,031 B2
(45) Date of Patent: Jun. 14, 2022

(54) DYNAMIC LINGUISTIC ASSESSMENT AND MEASUREMENT

(71) Applicant: International Business Machines Corporation, Armonk, NY (US)

(72) Inventors: Kyle Croutwater, Chapel Hill, NC (US); Vikrant Verma, Raleigh, NC (US); Zhe Zhang, Cary, NC (US); Le Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 728 days.

(21) Appl. No.: 16/154,057

(22) Filed: Oct. 8, 2018

(65) Prior Publication Data
US 2020/0110834 A1    Apr. 9, 2020

(51) Int. Cl.
| | |
|---|---|
| G06F 16/908 | (2019.01) |
| G06N 20/00 | (2019.01) |
| G06F 16/28 | (2019.01) |
| G06F 16/40 | (2019.01) |
| G06F 40/30 | (2020.01) |

(52) U.S. Cl.
CPC .......... *G06F 16/908* (2019.01); *G06F 16/285* (2019.01); *G06F 16/40* (2019.01); *G06F 40/30* (2020.01); *G06N 20/00* (2019.01)

(58) Field of Classification Search
CPC ...... G06F 16/285; G06F 16/40; G06F 16/908; G06F 40/30
See application file for complete search history.

(56) References Cited

U.S. PATENT DOCUMENTS

| | | | |
|---|---|---|---|
| 9,576,248 B2 | 2/2017 | Hurwitz | |
| 9,807,472 B1 | 10/2017 | Cox | |
| 2016/0092557 A1* | 3/2016 | Stojanovic | ............ G06F 16/254 |
| | | | 707/723 |
| 2017/0308613 A1* | 10/2017 | Zhu | ..................... G06F 16/9535 |

FOREIGN PATENT DOCUMENTS

WO    2017032559    3/2017

OTHER PUBLICATIONS

Ahltorp, Magnus et al. "Expansion of medical vocabularies using distributional semantics on Japanese patient blogs." Journal of biomedical semantics vol. 7,1 58. Sep. 26, 2016, doi: 10.1186/s13326-016-0093-x, pp. 1-18 (Year: 2016).*

(Continued)

*Primary Examiner* — Scott T Baderman
*Assistant Examiner* — Seung Woon Jung
(74) *Attorney, Agent, or Firm* — Lieberman & Brandsdorfer, LLC

(57) ABSTRACT

Embodiments are directed to a system, a computer program product, and a method for identification of linguistically related elements, and more specifically to prediction of a linguistically related element. A linguistic algorithm forms a cluster representation of corpus entries. A linguistic term is identified and applied to the cluster representation to identify proximally related linguistic terms. Associative relationships between the proximally related terms and category metadata are iteratively investigated. One or more linguistic terms related across the two more metadata categories is identified and designated as the linguistically related element.

20 Claims, 9 Drawing Sheets

(56) References Cited

OTHER PUBLICATIONS

Heuer, H., Text Comparison Using Word Vector Representations and Dimensionality Reduction, Proceedings of the 8th European Conference on Python in Science (Euroscipy 2015), pp. 13-16.
Juhari, A.S., Evaluation of Competitive Intelligence Software For MSC-Status Small and Medium-Sized Enterprises in Malaysia, Loughborough University, 2009.
Anonymous, A process for using a stored semantic representation of a document, a Semantic Bookmark, to locate similar documents in the future, Feb. 11, 2011.
Technical News Special, IPCOM000217410D, May 7, 2012.
Anonymous, System and Method of Semantic Similarity Based Fuzzy Vector Space Model Ranking, Mar. 9, 2015.
Shirai, K. et al., Recurrent Neural Network with Word Embedding for Complaint Classification, Proceedings of WLSI/OIA F4HLT, pp. 36-43, Osaka, Japan, Dec. 12, 2016.
Dieng, A. B. et al., TopicRNN: A Recurrent Neural Network With Long-Range Semantic Dependency, ICLR Conference Paper, 2017.
Timme, Alden, The Data-Driven Approach to Finding Similar Companies, Apr. 10, 2018.

\* cited by examiner

DYNAMIC LINGUISTIC ASSESSMENT AND MEASUREMENT

BACKGROUND

The present embodiments relate to an artificial intelligence platform configured to process textual material. More specifically, the embodiments relate to application of linguistics and linguistic processing to the artificial intelligence platform directed at linguistic relationships.

In the field of artificial intelligent computer systems, natural language systems (such as the IBM Watson® artificial intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

Cognitive systems are inherently non-deterministic. Specifically, data output from cognitive systems are susceptible to information provided and used as input. For example, as new machine learning models are deployed there is no guarantee that the system will extract the same entities or the same linguistic relationships as done previously. New models may adversely affect prior model results. Accordingly, there is a need to create deterministic and predictive behavior in the cognitive systems.

Text mining extracts linguistic facets, which are sets of words and phrases representing features of documents. Facets correspond to properties of information elements. Facets are significant aspects of documents; facets are derived from either metadata that is already structured or from concepts that are extracted from textual content. For example, facets may include people, places, organizations, sentiment analysis, etc. Facets are often derived by analysis of text of an item using entity extraction techniques or from pre-existing fields in a database, such as author, descriptor, language, and format. In a content analytics collection, facets are selected to explore analyzed content and discover patterns, trends, and deviations in data over time. Determining which facets are displayed and what contributes to each facet is a critical design task for successful content mining.

Conventional techniques for text mining utilize an external editor to manage facets and application of facets to a dictionary associated with the text mining. These techniques have limitations in that the process for adding a word found in the text mining process requires a rebuilding of an associated index to check if the added words function well with the text mining.

SUMMARY

The embodiments described herein include a system, a computer program product, and a method for dynamic linguistic assessment and measurement.

In one aspect, a computer system is provided with a processing unit operatively coupled to memory, and a knowledge engine in communication with the processing unit. The knowledge engine is comprised of tools to support linguistic assessment and similarity measurement. The tools include, but are not limited to, document and linguistic managers, and a director. The document manager is configured to apply a linguistic algorithm to a corpus and form one or more cluster representations of corpus entries. The linguistic manager is configured to identify and apply one or more linguistic terms to the cluster representations together with a nearness factor. This application returns a first group of linguistic terms proximal to the linguistic term applied by the linguistic manager. The director functions to iteratively identify associative relationships, including first and second associative relationships. More specifically, an outcome is generated from the iterative identification, with the outcome including at least one linguistic term in the first group that is related to metadata associated with both the first and second associated relationships.

In another aspect, a computer program product is provided to support the dynamic linguistic assessment and measurement. The computer program product includes a computer readable storage medium with embodied program code that is configured to be executed by a processing unit. Program code is provided to apply a linguistic algorithm to a corpus, and to form cluster representations of entries in the corpus. In addition, program code is provided to identify and apply one or more linguistic terms to the clusters together with a nearness factor. This application returns a first group of linguistic terms proximal to the linguistic term applied by the linguistic managers. Program code is provided to iteratively identify associative relationships, including first and second associative relationships. More specifically, an outcome is generated from the iterative identification, with the outcome including at least one linguistic term in the first group that is related to metadata associated with both the first and second associated relationships.

In a further aspect, a method is provided to support an artificial intelligence platform for identifying linguistically related elements. A linguistic algorithm is applied to a corpus, and cluster representations of entries in the corpus are formed. Linguistic terms are identified and applied to the cluster representations together with a nearness factor. This application returns a first group of linguistic terms proximal to the linguistic term applied to the corpus. Associative relationships are iteratively identified, including first and second associative relationships. An outcome is generated from the iterative identification. The outcome includes at least one linguistic term in the first group that is related to metadata associated with both the first and second associated relationships.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

FIG. 1 depicts a block diagram illustrating a text mining system and tools to provide context to word vector and document vector representations, and linguistic processing responsive to the representations.

DETAILED DESCRIPTION

Figure 1:
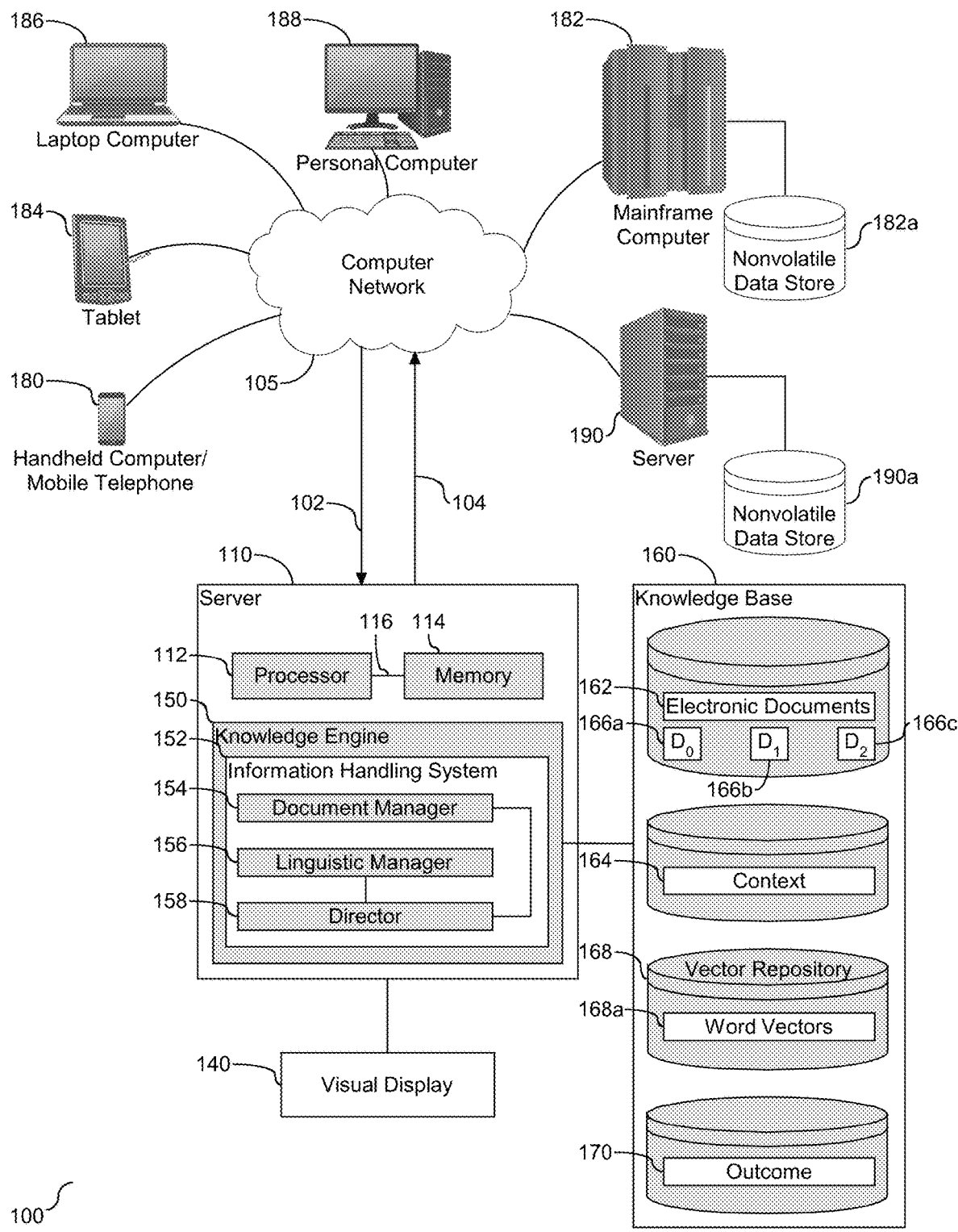

It will be readily understood that the components of the present embodiments, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As shown and described herein computational linguistics is applied to identify linguistically related elements. It is understood that computational linguistics is the application of computer science to analysis, synthesis and comprehension of written and spoken language. A computational understanding of language provides insight into substantive aspects of linguistic elements in the underlying texts, and improves the relationship between computers and basic language. One aspect of computational linguistics is directed at building linguistic structures, such as word vectors, that can be used to process associated linguistic data. Word vectors refer to a set of language modeling and feature learning technique in natural language processing (NLP) where words or phrases from a vocabulary are mapped to vectors of real numbers. Words that share common context in a corpus are located or positioned in close proximity. It is understood in the art that algorithms embedded as models are used to produce word vectors. One known algorithm is referred to as word2vec, which is a neural net based model that converts words into equivalent vector representation, thereby giving equal weight to all documents present in a corpus. The word2vec is trained on a corpus of data irrespective of any given context or domain.

A text mining system has two types of applications, including a text mining application and a dictionary editor application. The text mining application supports a query of a subset of documents and returns document content and statistical analysis of data associated with each facet. The dictionary editor application supports facet management with respect to creation, editing, and deletion of its content. It is understood that defining the facets and their values are essential to effective analysis results in a text mining system. As shown and described below, text mining is integrated with dynamic facet editing. More specifically, a text mining tool and a dictionary management tool are integrated to support calculation of an approximate value for words present in the facet. The calculation returns analytics results, including but not limited to, statistics information, such as frequency and correlation. Frequency is directed at the number of documents that contain the specific facet value. Correlation is a measure of how strongly the facet value is related to the set of documents that are selected by the current query, compared to other documents in the collection. The analytics results are returned without a re-indexing of the dictionary.

Referring to FIG. 1, a schematic diagram of a computer system (100) is depicted to provide context to word vector and document vector representations, and linguistic processing responsive to the representations. As shown, a server (110) is provided in communication with a plurality of computing devices (180), (182), (184), (186), and (188) across a network connection (105). The server (110) is configured with a processing unit (112) in communication with memory (116) across a bus (114). The server (110) is shown with a knowledge engine (150) for document, context, and linguistic processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable processing of documents and context for one or more content users. Other embodiments of the server (110) may be used with components, systems, subsystems, and/or devices other than those that are depicted herein.

The knowledge engine (150) may be configured to receive input from various sources. For example, knowledge engine (150) may receive input from the network (105), one or more knowledge bases of corpus (160) of electronic documents (162), or other data, content users, and other possible sources of input. In selected embodiments, the knowledge base (160), also referred to herein as corpus, may include structured, semi-structured, and/or unstructured content in a plurality of documents that are contained in one or more large knowledge databases or corpus. The various computing devices (180), (182), (184), (186), and (188) in communication with the network (105) may include access points for content creators and content users. Some of the computing devices may include devices for a database storing the corpus of data as the body of information used by the knowledge engine (150), and to process the corpus of data with respect to word vector generation based on context, thereby enhancing natural language based services. The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from or represented in documents, network accessible sources and/or structured data sources. In this manner, some processes populate the knowledge engine (150) with the knowledge engine (150) also including input interfaces to receive requests and respond accordingly.

As shown, content may be in the form of one or more electronic documents or files (162) for use as part of the corpus (160) of data with the knowledge engine (150). The corpus (160) may include any structured and unstructured documents, including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit natural language input to the knowledge engine (150) that may effectively be processed into context based word vector representation. As further described below, the word vector representation functions as a mathematical tool for representation of words as vectors.

As shown, the server (110) is in communication with a knowledge base (160) of text based documents or documentation. The knowledge base (160) functions as a corpus, and in one embodiment, may be comprised of multiple corpi, including but not limited to a collection of written texts and may be a network of text based collections. Alternatively, the knowledge base (160) may function as a single corpus. The knowledge base (160) is shown operatively coupled to the server (110) across the network (105). In one embodiment, the knowledge base (160) may be stored on shared data storage, such as a cloud shared resource. Similarly, in one embodiment, the knowledge base (160) may be locally coupled to the server (110). In the example shown herein, the knowledge base (160) is comprised of shared resources operatively coupled to the server (110) across the network (105). More specifically, the knowledge base (160) is shown with data resources shown herein as $D_0$ (166a), $D_1$ (166b), and $D_2$ (166c). In one embodiment, each data resource may be a collection of documents that are accessible by the server (110) or any computing device operatively coupled to the knowledge base (160).

Context (164), e.g. given by a problem definition or extracted from behavior, is communicated to the knowledge engine (150), so that the context (164) may be interpreted and utilized by the knowledge engine (150). As shown, the knowledge engine (150) is local to the server (110). In some illustrative embodiments, server (110) may be the IBM Watson® system available from International Business Machines Corporation of Armonk, N.Y., which is augmented with the mechanisms of the illustrative embodiments described hereafter. As shown, the server (110) includes an information handling system (152) which utilizes tools in the form of a document manager (154), a linguistic manager (156), and a director (158). Though shown as being embodied in or integrated with the server (110), the information handling system (152) and the associated managers (154) and (156), and director (158) may be implemented in a separate computing system (e.g., 190) that is connected across network (105) to the server (110). Wherever embodied, the managers (154) and (156), and the director (158), function to provide and assess linguistic analysis of documents with respect to associated context.

The document manager (154) functions to manage access to the knowledge base (160) and associated documents or files (162) and/or data resources (166a) (166c). More specifically, the document manager (154) applies a linguistic algorithm to select documents, files, and/or data resources. In one embodiment, the document manager (154) generates word vectors for representation of the content within the documents or files (162) and/or data resources (166a) (166c). As shown herein, the document manager (154) generates word vectors (168a) for the selected documents or files (162) and/or data resources (166a)-(166c), and stores the generated vectors in a vector repository (168). It is understood in the art that vector representation of textual data is a language modeling and feature learning technique in natural language processing (NLP). A clustering algorithm may be applied to the vector representation to find interesting data within the vector representation. Clustering is directed at grouping similar text units within a collection of documents. The document manager (154) forms one or more cluster representations of documents or files (162) and/or data resources (166a)-(166c), with each cluster representing a common topic. Accordingly, documents or files are processed via a vectoring algorithm and organized into clusters via associated topics, thereby creating a formation of cluster representations of entries in the corpus.

The linguistic manager (156), shown herein as operatively coupled to the document manager (154), functions to apply one or more linguistic terms to the cluster representation(s). More specifically, the linguistic manager (156) identifies a linguistic term within a category of linguistic terms. Details of the linguistic category and term identification are described in detail below. Once the linguistic term is identified, the linguistic manager (156) applies the term to the cluster representation. It is understood that this application functions to identify linguistically related terms found within the cluster. A nearness factor is introduced by the linguistic manager (156) to parse linguistically related terms found within the cluster that are or may be more closely related to the linguistic term applied by the linguistic manager. In one embodiment, the nearness factor is a radius, and related terms that fall within the radius are deemed more relevant to the applied linguistic term than related terms that fall outside of the radius. Accordingly, the nearness factor is applied by the linguistic manager (156) to return a first group of linguistic terms that are determined to be proximal to the cluster representation and the applied first linguistic term.

Figure 2:
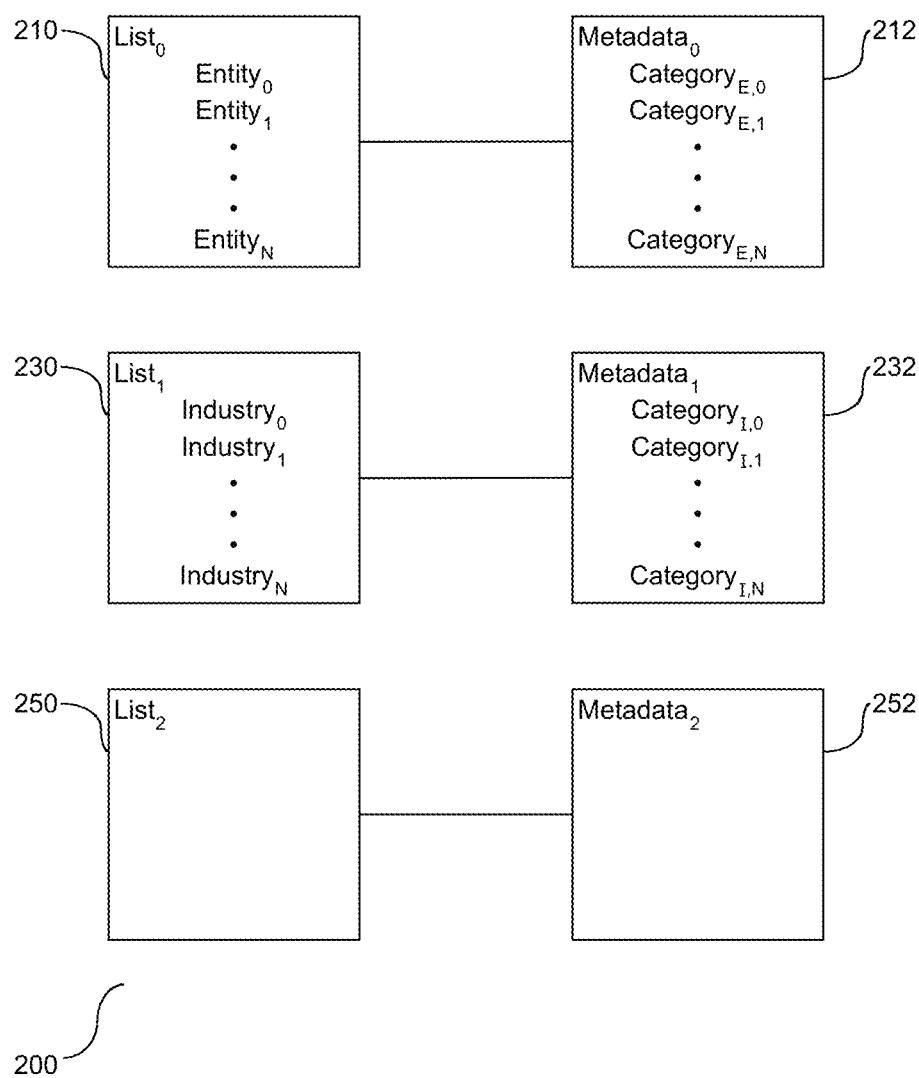
FIG. 2 depicts a block diagram illustrating a term categories and associated metadata.

As further shown, a director (158) is operatively coupled to the linguistic manager (156). The director (158) functions to identify one or more associated relationships of the applied linguistic term to one or more categories of terms. Referring to FIG. 2, a block diagram (200) is provided illustrating term categories and associated metadata. It is understood in the art that linguistic elements may be organized into lists, with each list having different defining characteristics. As shown herein there are three lists including $list_0$ (210), $list_1$ (230), and $list_2$ (250). Although only three lists are shown, this is merely for demonstration and the quantity should not be considered limiting. It is understood that the lists shown herein are semantically related. In one embodiment, $list_0$ (210) is a list of corporate entities, e.g. companies, $list_1$ (230) is an industry list, and $list_2$ (250) is a combination of $list_0$ (210) and $list_1$ (230). Each list has associated metadata that describes items that are members of the associated list. As shown, $list_0$ (210) has associated $metadata_0$ (212), and $list_1$ (230) has associated $metadata_1$ (232). In the example described above where $list_0$ (210) is a list of corporate entities, the associated $metadata_0$ (212) describes corporate categories, and wherein $list_1$ (230) is an industry list, the associated $metadata_1$ (232) describes industry categories. Accordingly, each list includes directly associated metadata.

The linguistic manager (156) functions to identify one or more linguistic terms in the cluster representation. The director (158) functions to iteratively identify associative relationships between category metadata and the identified linguistic term(s) in the cluster. An associated relationship is identified for each category of metadata. As shown in FIG. 2, there are at least two categories within associated metadata, with the director iteratively identifying a first associative relationship with first metadata from the first category (list in FIG. 2) of terms, and identifying a second associative relationship with second metadata from the second category (list in FIG. 2) of terms. Based on the semantic relationship between the content of the lists shown in FIG. 2, the first and second categories (lists in FIG. 2) of terms are semantically related. The first and second associative relationships identified by the director (158) are semantically related via the relationship between the categories of the first and second metadata, respectively. The function and actions of the director (158) generate an outcome (170) in the form of one or more linguistic terms and their relationship to the first and second metadata. In one embodiment, the outcome (170) is presented on a visual display (140) operatively coupled to the server (110). As shown and described herein, vector representations and application of a linguistic term to the associated cluster representation identifies and quantifies linguistic relationships, with the outcome (170) directed at bridging the quantified relationships. In one embodiment, the outcome (170) functions as predictive data. Accordingly, as shown herein clustering of vector representations are employed to identify associative relationships, and generate an outcome in the form of one or more related linguistic terms with respect to the identified relationship.

Referring to FIG. 2, each list includes respective metadata. The associative relationship in each of the categories with their metadata is limited to categorically related data. In other words, the first associative relationship with the first metadata is limited to first categorically related data, and the second associated relationship with the second metadata is limited to second categorically related data. Each associative relationship excludes terms associated with the bridging conducted by the director (158). More specifically, the first associative relationship and the second associative relationship each excludes a compilation of terms associated with the first linguistic term.

It is understood that in linguistics, the corpus is a collection and structured set of texts. The corpus is itself subject to change. Such change may be based on removing a text from the corpus or adding a text to the corpus. Similarly, such change may be based on a change in the composition or content of a text that is a member of the corpus. As the corpus changes, the generated outcome (170) may also be subject to change. The linguistic manager (154) addresses the dynamic characteristic(s) of the corpus by application of a linguistic term to the cluster representation responsive to a detected change in the composition of the corpus. Similarly, the linguistic manager (154) is not limited to a single application of a linguistic term to the cluster representation.

In one embodiment, the linguistic manager (154) may apply a sequence of linguistic terms to the cluster representation, thereby effectively training the cluster representation against the linguistic terms. Accordingly, the linguistic manager (154) is configured to adapt to the corpus and the associated cluster representation(s).

As shown, the information handling system (152) employs tools to integrate vectorization of textual data together with cluster representations, and associated identification of one or more linguistic terms within the cluster representations. The tools include, but are not limited to, a document manager (154), a linguistic manager (156), and a director (158). The functionality of each tool is shown and described herein. A result of the vector representations as provided by the information handling system (152) is directed at identification of relationships among different categories, with the identification generating an outcome of one or more linguistic terms that exemplify the relationships. Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

Figure 3A:
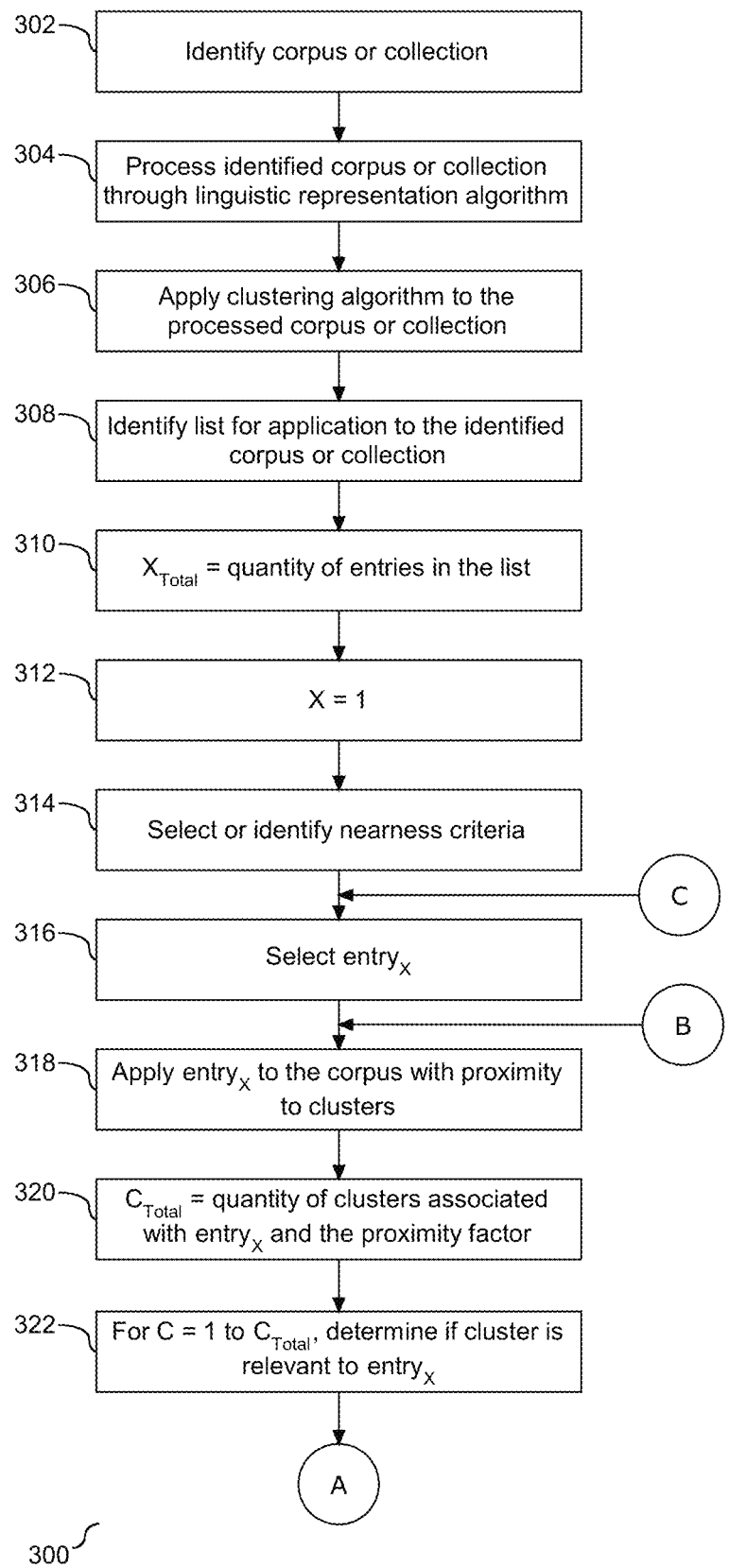
FIGS. 3A and 3B depict a flow chart illustrating processing of the corpus and generating the outcome.
Figure 3B:
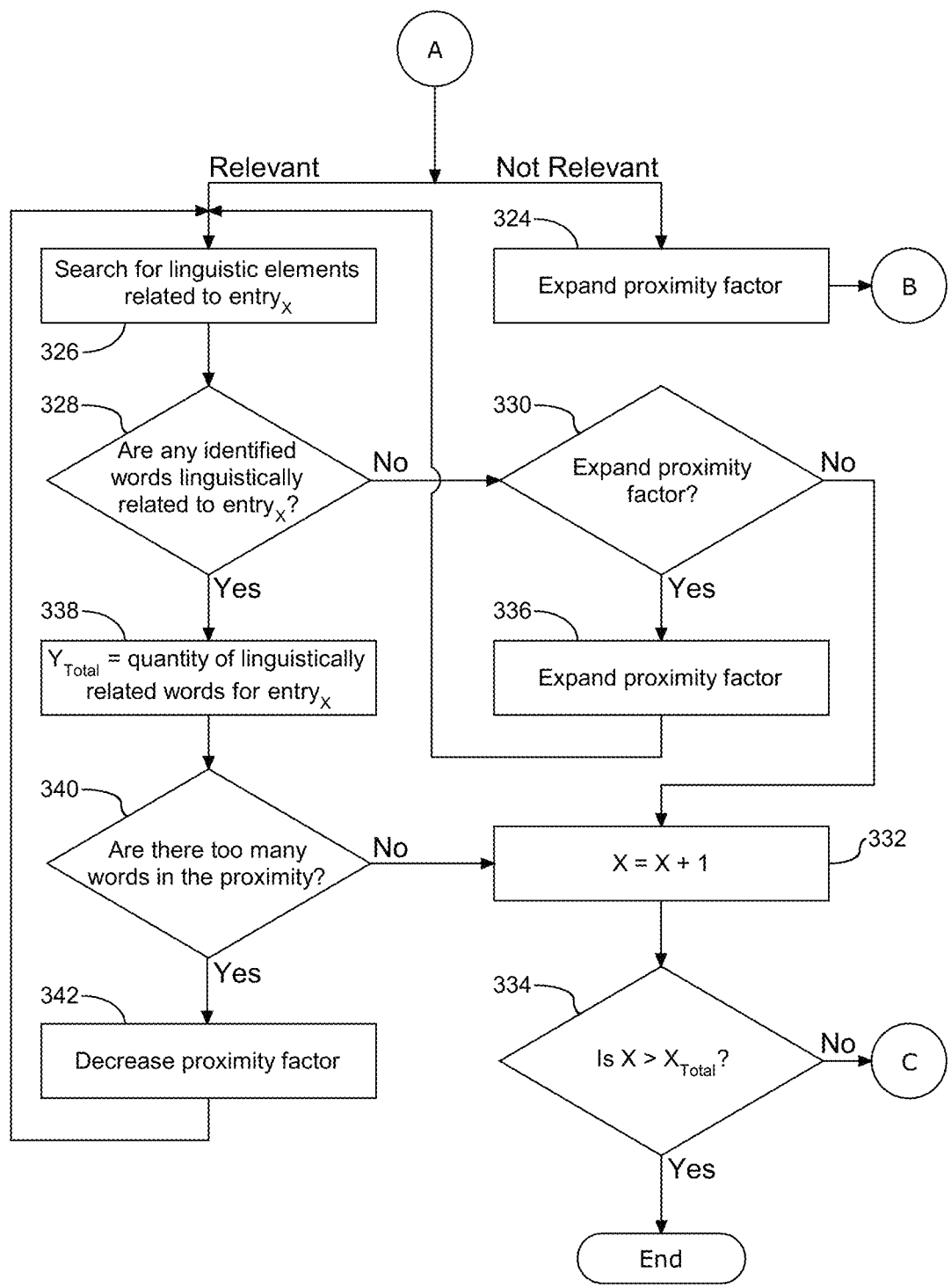

Referring to FIGS. 3A and 3B, a flow chart (300) is provided illustrating processing of the corpus and generating the outcome. A corpus or collection of textual material is identified or selected (302) and processed through a linguistic representation algorithm (304). More specifically, at step (304) each entry in the corpus is converted to a mathematically representation, e.g. vector format. With the conversion of the text to a mathematical format, a clustering algorithm is applied to the corpus to arrange the contents of textual material into clusters (306) with each cluster containing groupings of text based on related words. Accordingly, text material is mathematically analyzed and grouped with each group based on related words among the associated text material.

One or more linguistic terms are applied to the cluster representations of the corpus. Linguistic elements may be organized into lists, with each list having different defining characteristics. As shown in FIG. 2, two lists are provided, with each list having terms and associated metadata that describe items that are members of the associated list. A first list is identified for application to the corpus (308). The variable $X_{Total}$ is assigned to the quantity of entries in the list (310), and an entry counting variable is initialized (312). In addition, a nearness criteria is selected or otherwise identified (314). In one embodiment, the nearness criteria is a radius with respect to the vectors in the cluster. It is understood that the nearness criteria is subject to change. Similarly, each entry in the list has an associated vector representation, e.g. mathematical representation. $Entry_X$ is selected from the list (316) and applied to the corpus to search for words within the defined nearness criteria (318). More specifically, application of the entry to the corpus at step (318) identifies if the entry is proximal to any of the clusters within the corpus. Following step (318) the quantity of clusters associated with $entry_X$ by the nearness criteria is assigned to the variable $C_{Total}$ (320). It is then determined if any clusters have been identified as being relevant or related to $entry_X$ (322). A negative response to the determination at step (322) is followed by expanding the nearness criteria (324), followed by a return to step (318). Accordingly, the first aspect of the identification process is application of the list entries and identification of one or more relevant clusters in the corpus.

For each entry in the list, one or more clusters are identified, or the nearness criteria is expanded until one or more clusters are identified. It is understood that within the corpus at least one cluster is presented, and in one embodiment, two or more clusters are presented. The entry, $entry_X$, is applied to each cluster identified in the corpus, together with the defined nearness criteria to search for linguistic elements, e.g. linguistic terms, related to the entry (326). In one embodiment, the nearness criteria applied at step (326) may be the same or different from the nearness criteria applied at step (318). It is then determined if any words have been identified within the cluster(s) as linguistically related to the entry (328). A negative response to the determination at step (328) is followed by assessing whether to expand the nearness criteria (330). A negative response to the determination at step (330) is followed by incrementing the entry counting variable, X, (332) and assessing if all of the list entries have been processed to the corpus (334). A negative response to the determination at step (334) is followed by a return to step (316) for application of the next entry in the list to the corpus. Accordingly, each entry in the list is applied to each identified corpus together with the nearness criteria to identify linguistically related terms.

As shown at step (330), the nearness criteria may be subject to change. More specifically, it is understood that an initial nearness criteria may not be reasonable. If no words are identified within the nearness criteria, it may be recommended to increase the nearness criteria, e.g. expand the radius. A positive response to the determination at step (330) is followed by modifying the criteria to enlarge the proximity of the entry to the cluster (336). After the criteria has been modified, the process returns to step (326) to re-assess the entry with respect to the cluster representation of the corpus. In one embodiment, the quantity of words found within the nearness criteria, original or modified, may be too many. More specifically, it is understood that the goal is to define proximally related words, and if too many words are identified the nearness criteria may need to be modified to decrease the radius. As shown, following a positive response to step (328), the variable $Y_{Total}$ is assigned to the quantity of linguistically related and identified words (338). It is then determined if there are too many words (340), e.g. if the quantity exceeds a preset, tunable threshold. A positive response to the determination at step (340) is followed by decreasing the nearness criteria, e.g., a proximity factor (342), R, and returning to step (326) to re-assess the entry with respect to the cluster representation of the corpus. It is understood that each entry in the list is processed through each identified cluster within the corpus. Following a negative response to the determination at step (340), the process returns to step (332) to increment the entry counting variable, X, and assess if all of the list entries have been processed to the corpus (334). A positive response to the determination at step (334) concludes the search for linguistically related terms. Accordingly, as demonstrated herein, the nearness criteria is subject to change with respect to the quantity of entries returned from application to the clusters within the corpus.

Figure 4:
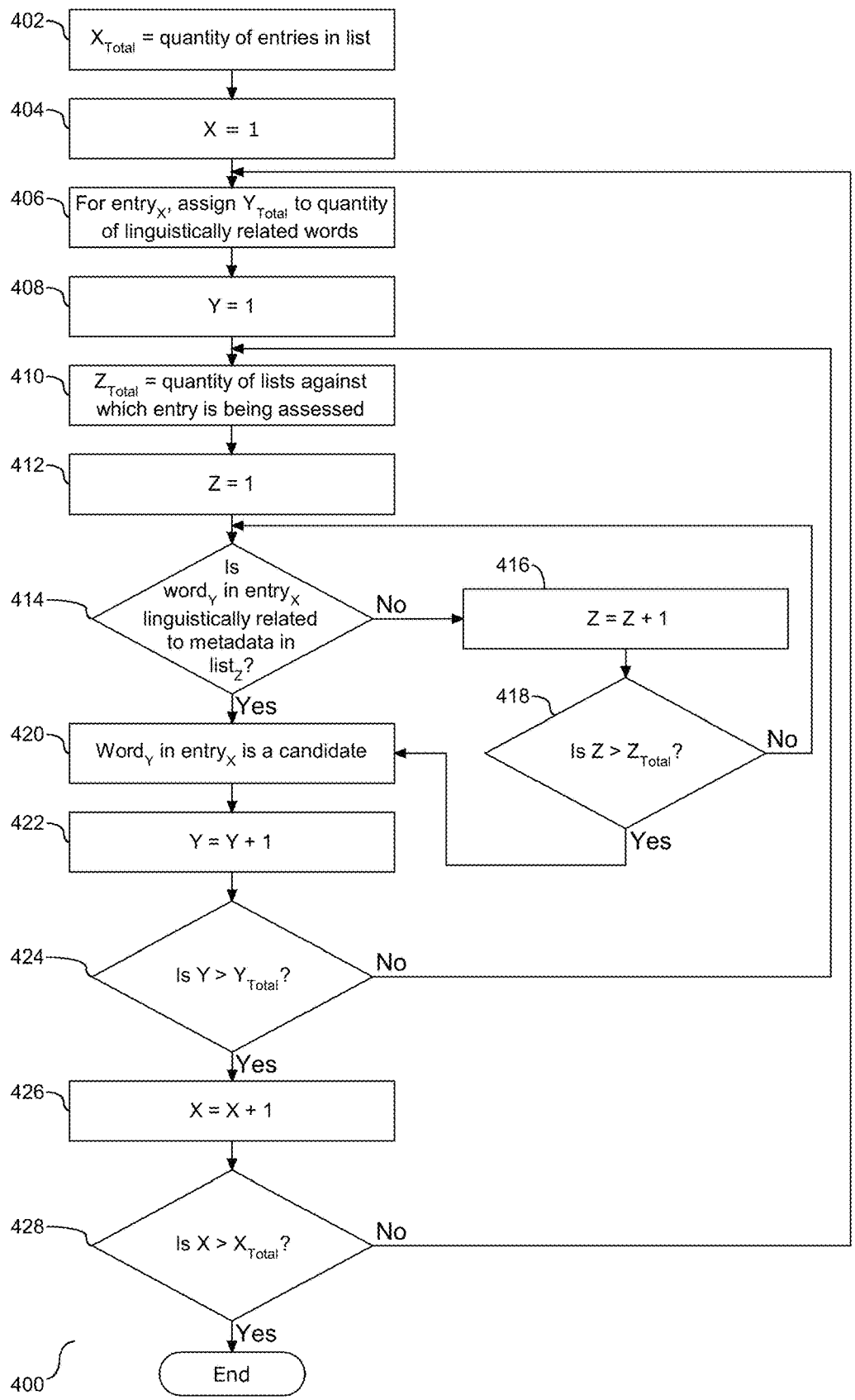
FIG. 4 depicts a flow chart illustrating a process for assessing the linguistically related words found in each cluster with respect to metadata related to the entry in the list.

Referring to FIG. 4, a flow chart (400) is provided illustrating a process for assessing the linguistically related words found in each cluster with respect to metadata related to the entry in the list. As shown in FIG. 2, two lists are provided, with each list having terms, e.g. entries, and each entry has metadata that describes the entry. The variable $X_{Total}$ is assigned to the quantity of entries in the list (402), and an entry counting variable, X, is initialized (404). For each entry, $entry_X$, the variable $Y_{Total}$ is assigned to the quantity of linguistically related and identified words within one or more clusters of the corpus representation (406). A related word counting variable, Y, is initialized (408). Similarly, the quantity of lists against which the entry is being assessed is assigned to the variable $Z_{Total}$ (410) and an associated list counting variable, Z, is initialized (412). It is then determined if $word_Y$ in $entry_X$ is linguistically related to the metadata in $list_Z$ (414). A negative response to the determination at step (414) is followed by incrementing the list counting variable, Z, (416), and then assessing if the word has been processed against each of the lists (418). A negative response to the determination at step (418) is followed by a return to step (414). Similarly, a positive response to the determination at step (414) is followed by identifying $word_Y$ in $entry_X$ as a candidate (420). In one embodiment, a new list or data structure is created to organize and/or store each of the identified candidates. Accordingly, each candidate identifies common metadata from each of the lists with respect to the cluster representation of the corpus.

As shown, each $word_Y$ is assessed against the metadata in each $list_Z$. A negative response to the determination at step (414) is an indication that $word_Y$ was not linguistically related to the metadata in the assessed list. In one embodiment, $word_Y$ may have been linguistically related to metadata in only a subset of the lists, or in another embodiment, not linguistically related to metadata in any of the lists. Following step (420), the word counting variable, Y, is incremented (422). It is then determined if each of the words, Y, for $entry_X$ have been assessed (424). A negative response to the determination at step (424) is followed by a return to step (410) for processing of the next word related to $entry_X$. Similarly, a positive response to the determination at step (424) is followed by incrementing the entry counting variable, X, (426), and determining if each of the entries in the list have been processed for candidate assessment (428). A negative response is followed by a return to step (406), and a positive response concludes the candidate assessment process. Accordingly, the process shown herein processes each of the linguistically related and identified words in the corpus against metadata associated with each list entry to identify a candidate linguistic term.

Figure 5:
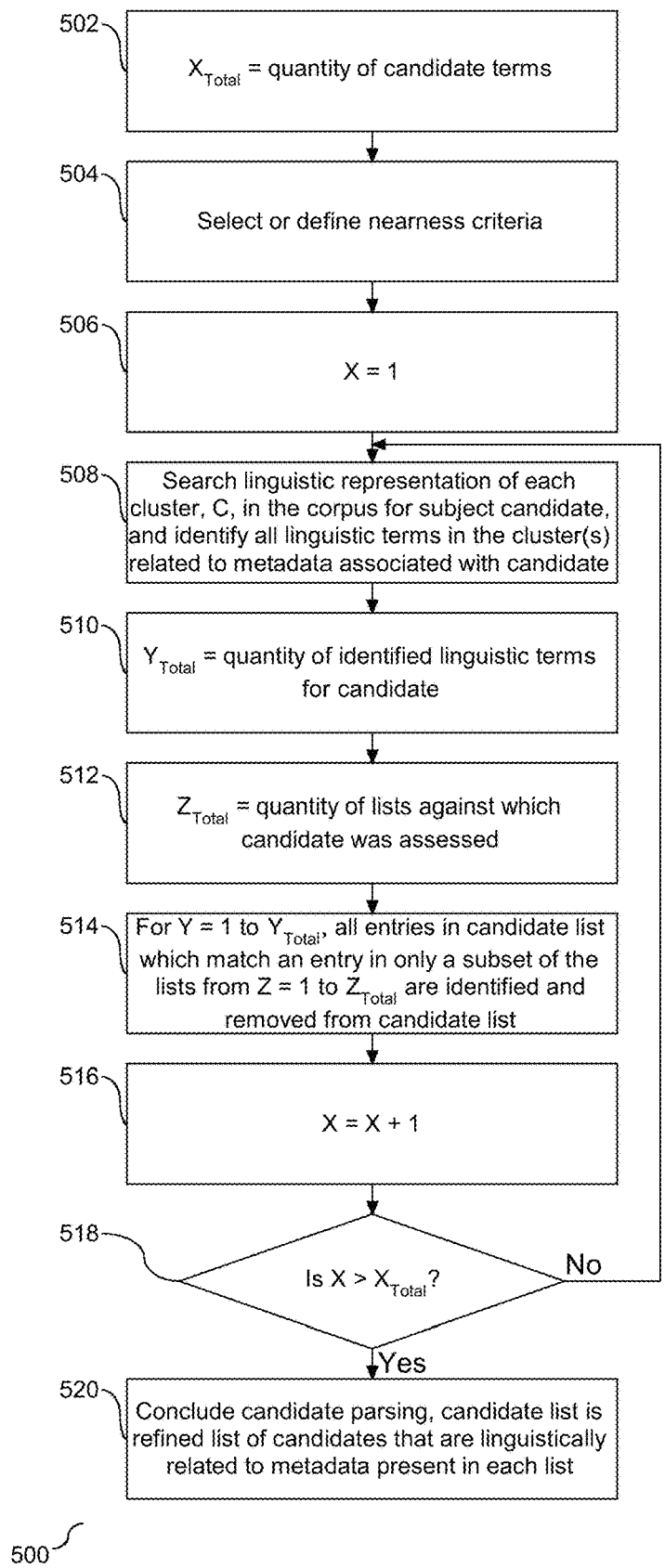
FIG. 5 depicts a flow chart illustrating a process of refining the candidate linguistic terms.

The processes shown in FIGS. 3 and 4 are directed at generating a list of candidate linguistic terms. Referring to FIG. 5, a flow chart (500) is provided to illustrate a process of refining the candidate linguistic terms. The quantity of candidate terms is assigned to the variable $X_{Total}$ (502). In addition, a nearness criteria, e.g. radius, is selected or defined (504). In one embodiment, the nearness criteria is an adjustable factor. The candidate term counting variable is initialized (506). A linguistic representation of each of the clusters, C, in the corpus is searched for the subject candidate, and all linguistic terms in the cluster(s) related to metadata associated with candidate$_X$ are identified (508). In one embodiment, the linguistic terms are identified and the associated quantity of linguistic terms is assigned to the variable $Y_{Total}$ (510). Similarly, the variable $Z_{Total}$ represents the quantity of lists against which the candidate was assessed (512). For each linguistic term, Y, all entries in the candidate list or data structure which match an entry in only a subset of the lists against which the candidate was assessed is removed (514). This removal process effectively parses the candidate terms. More specifically, the parsing ensures that each candidate remaining is linguistically related to metadata in each of the assessed lists. Following step (514), the candidate counting variable is incremented (516), and it is determined if all of the candidates have been processed (518). A negative response to the determination at step (518) is followed by a return to step (508), and a positive response concludes the candidate parsing process. More specifically, the positive response at step (518) yields a refined list of candidates that are linguistically related to metadata present in each of the lists or compilations against which the candidate(s) was assessed (520).

The processes shown and described in FIGS. 3-5 are designed to be applied into a real-world application. In one embodiment, the application may be directed to a machine learning (ML) environment. For example, competitors may be identified by using a ML approach that performs clustering of word vectors, e.g. from a word2vec skip-gram model or recurrent neural network, with an objective function of predicting the next word on news and factual data. In one embodiment, the ML approach creates a vector for each company, and company vectors are trained based on word co-occurrences based on their news. Distinctive characteristics of companies are dynamically captured and applied to predict one or more surrounding words based on a given word, and/or applied to predict or identify one or more company competitors. Accordingly, the compiled candidate(s) are mathematically and categorically related to one or more linguistic terms applied to the cluster representation(s) within the corpus.

Embodiments may also be in the form of a computer program device for use with an intelligent computer platform in order to assist the intelligent computer platform to identify one or more mathematically related candidates. The device has program code embodied therewith. The program code is executable by a processing unit to execute the functionality of the tools of the knowledge engine (152), e.g. the document manager (154), the linguistic manager (156), and the director (158). Aspects of the functional tools, e.g. document manager, linguistic manager, and director, and their associated functionality may be embodied in a computer system/server in a single location, or in one embodiment, may be configured in a cloud based system sharing computing resources.

With references to FIG. 6, a block diagram (600) is provided illustrating an example of a computer system/server (602), hereinafter referred to as a host (602) in communication with a cloud based support system, to implement the processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
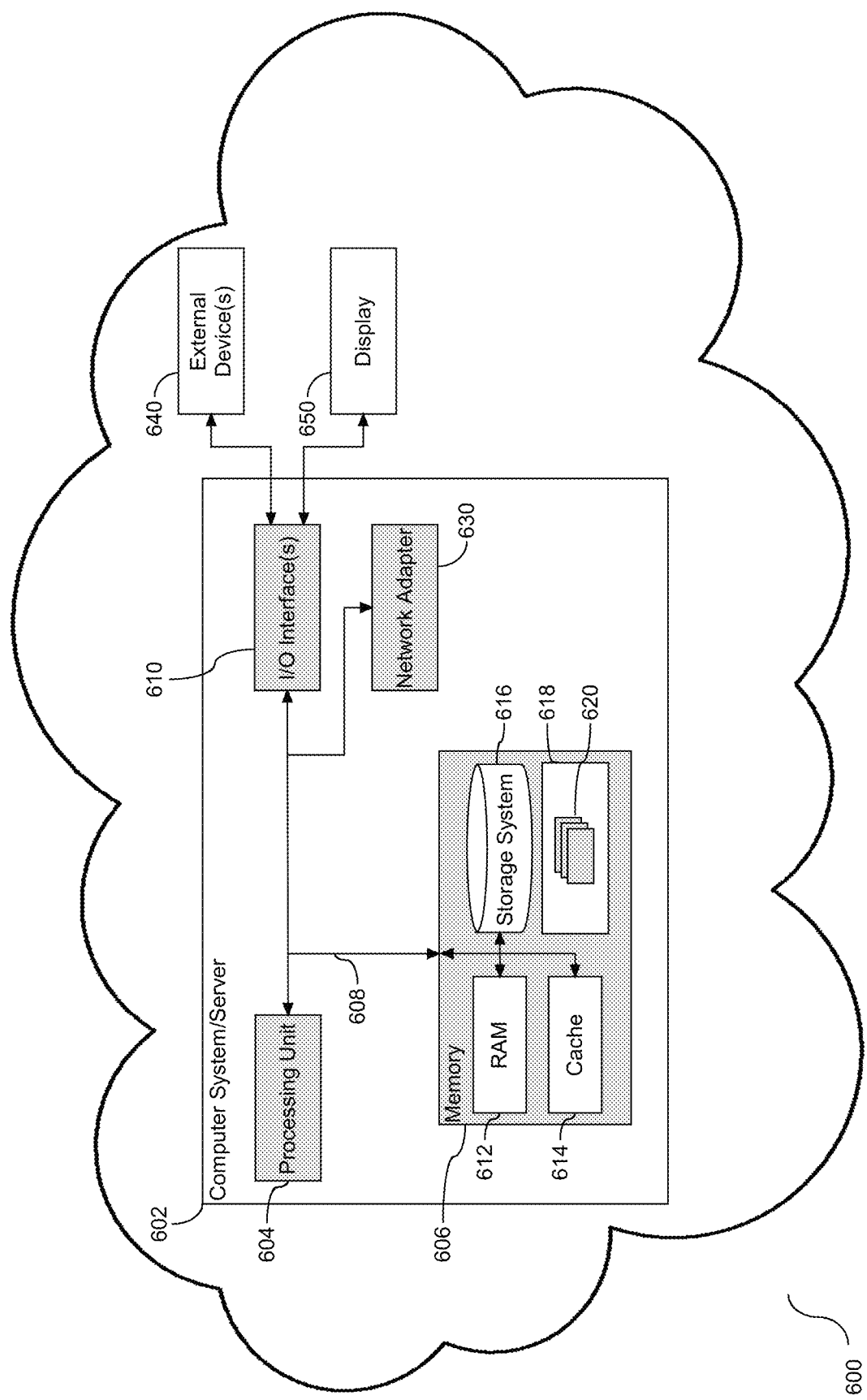
FIG. 6 depicts a block diagram illustrating an example of a computer system/server of a cloud based support system, to implement the system and process described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (612) and/or cache memory (614). By way of example only, storage system (616) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (618), having a set (at least one) of program modules (620), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (620) generally carry out the functions and/or methodologies of embodiments supported by the information handling system (152) and the tools (154)-(158). For example, the set of program modules (620) may include the modules configured as the document and linguistic managers, and the director as described in FIGS. 1-5.

Host (602) may also communicate with one or more external devices (640), such as a keyboard, a pointing device, etc.; a display (650); one or more devices that enable a user to interact with host (602); and/or any devices (e.g., network card, modem, etc.) that enable host (602) to communicate with one or more other computing devices. Such communication can occur via Input/Output (I/O) interface(s) (610). Still yet, host (602) can communicate with one or more networks such as a local area network (LAN), a general wide area network (WAN), and/or a public network (e.g., the Internet) via network adapter (630). As depicted, network adapter (630) communicates with the other components of host (602) via bus (608). In one embodiment, a plurality of nodes of a distributed file system (not shown) is in communication with the host (602) via the I/O interface (610) or via the network adapter (630). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (612), cache (614), and storage system (616), such as a removable storage drive and a hard disk installed in a hard disk drive.

Computer programs (also called computer control logic) are stored in memory (606). Computer programs may also be received via a communication interface, such as network adapter (630). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
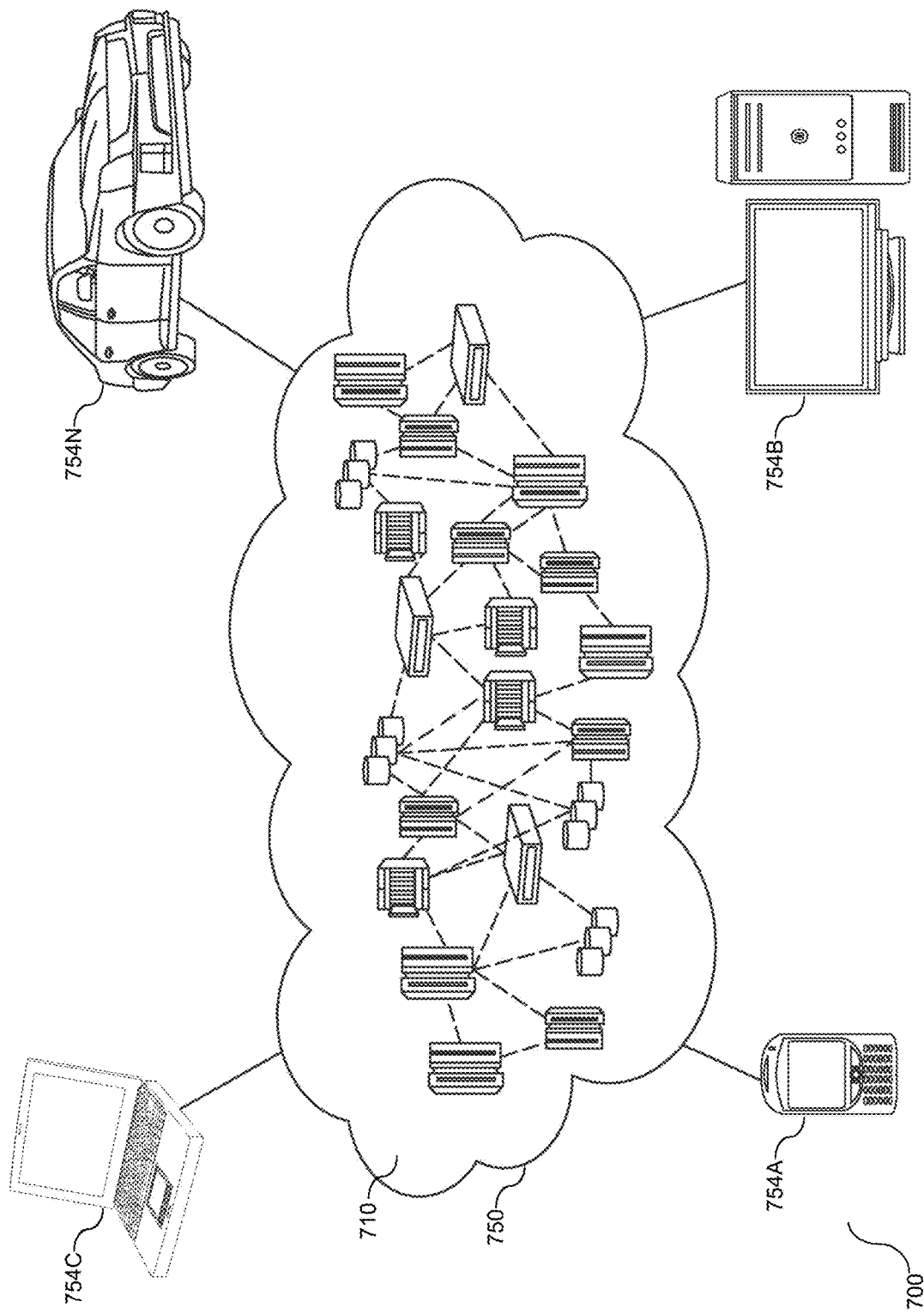
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
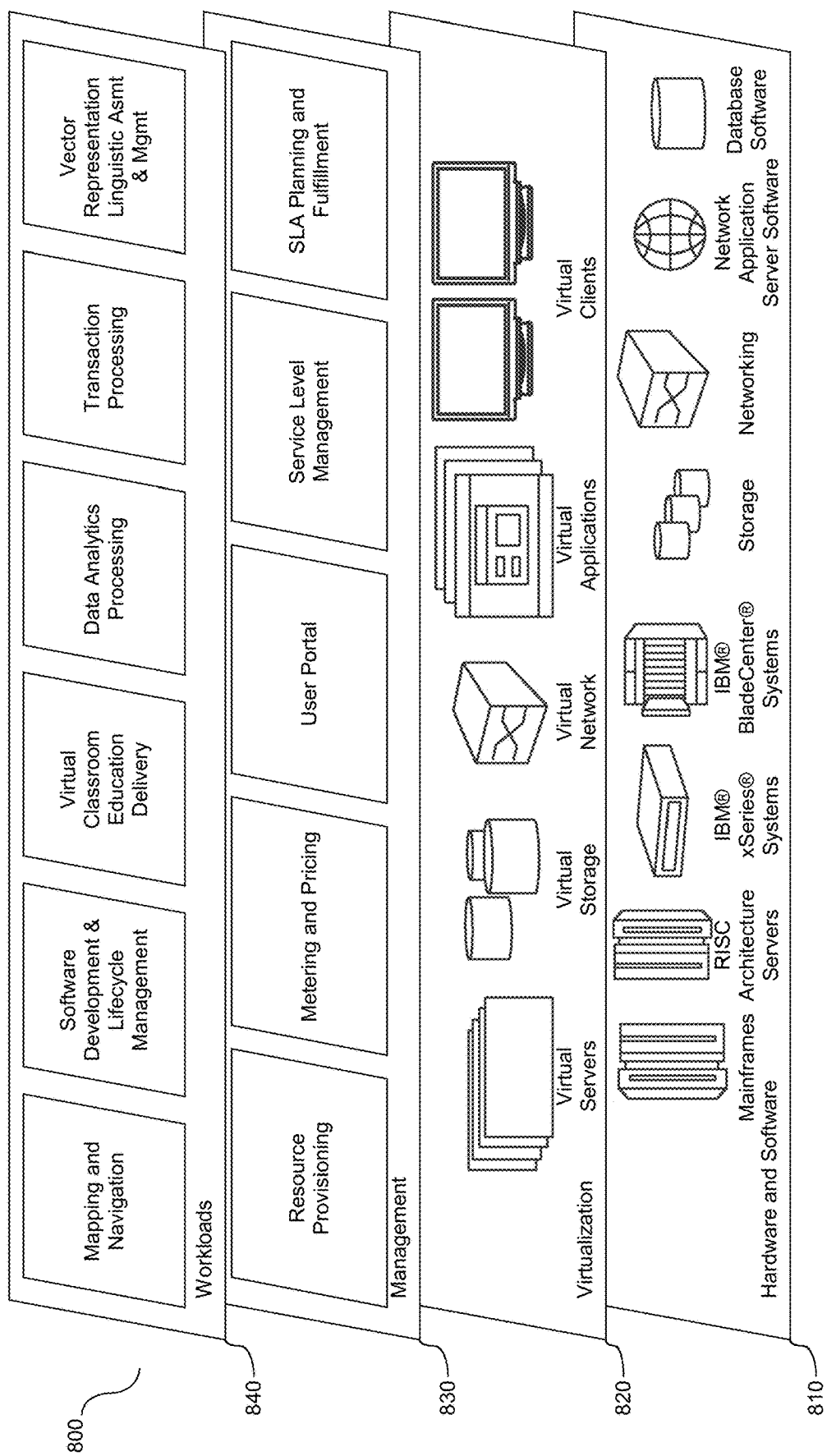
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and vector representations and linguistic assessment and management.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the vector modeling and associated linguistic application provides context sensitivity with respect to candidate assessment and identification.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting examples, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processing unit operatively coupled to memory;
   an artificial intelligence platform in communication with the processing unit; and
   a knowledge engine in communication with the processing unit and configured to identify linguistically related elements upon activation by the artificial intelligence platform, including:
      a document manager configured to apply a linguistic algorithm to a corpus and form a cluster representation of entries in the corpus;
      a linguistic manager configured to identify a first linguistic term within a first category of terms and apply the first linguistic term to the cluster representation, apply a first nearness criteria, and return a first group of candidate linguistic terms proximal to the applied first linguistic term; and
      a director configured to refine the first group of candidate linguistic terms, including:
         for each candidate linguistic term iteratively identify:
            a first associative relationship with first metadata of the first category of terms; and
            a second associative relationship with second metadata of a second category of terms, wherein the first category is semantically related to the second category; and
         selectively remove one or more linguistic terms from the first group that do not meet both the first and second associative relationships;
      and
      form a second group from the iterative identification, including selectively remove one or more linguistic terms from the first group, the second group having a membership limited to linguistic terms in the group having both the first associative relationship with the first metadata of the first category of terms and the second associative relationship with the second metadata of the second category of terms.

2. The system of claim 1, wherein the first associative relationship with the first metadata is limited to first categorically related data, and excludes a first compilation of terms associated with the first linguistic term.

3. The system of claim 1, wherein the second associative relationship with the second metadata includes data categorically related to the second metadata and excludes a second compilation of terms associated with the first linguistic term.

4. The system of claim 1, wherein the linguistic manager is further configured to dynamically apply a second linguistic term to the cluster representation responsive to a detected change in a composition of the corpus.

5. The system of claim 1, wherein the cluster representation includes a vector representation of entries of corpus, and the first nearness criteria is a radius.

6. The computer system of claim 1, wherein the first associative relationship with the first metadata is first categorically related data, the second associative relationship with the second metadata is second categorically related data, and the first and second categories are semantically related.

7. The system of claim 1, wherein each candidate term identifies common metadata from the first category of terms and the second category of terms.

8. A computer program product for identify linguistically related elements and prediction, the computer program product comprising:
a computer readable storage device having program code embodied therewith, the program code executable by a processor to:
apply a linguistic algorithm to a corpus and form a cluster representation of entries in the corpus;
identify a first linguistic term within a first category of terms and apply the first linguistic term to the cluster representation, apply a first nearness criteria, and return a first group of candidate linguistic terms proximal to the applied first linguistic term;
refine the first group of candidate linguistic terms, including for each candidate linguistic term iteratively identify:
a first associative relationship with first metadata of the first category of terms; and
a second associative relationship with second metadata of a second category of terms, wherein the first category is semantically related to the second category; and
selectively remove one or more linguistic terms from the first group that do not meet both the first and second associative relationships; and
form a second group from the iterative identification, including selectively remove one or more linguistic terms from the first group, the second group having a membership limited to the linguistic terms in the group having both the first associative relationship with the first metadata of the first category of terms and the second associative relationship with the second metadata of the second category of terms.

9. The computer program product of claim 8, wherein the first associative relationship with the first metadata includes data categorically related to the first metadata and excludes a first compilation of terms associated with the first linguistic term.

10. The computer program product of claim 8, wherein the second associative relationship with the second metadata includes data categorically related to the second metadata and excludes a second compilation of terms associated with the first linguistic term.

11. The computer program product of claim 8, further comprising program code executable by the processor to dynamically apply a second linguistic term to the cluster representation responsive to a detected change in a composition of the corpus.

12. The computer program product of claim 8, wherein the cluster representation includes a vector representation of entries of the corpus, and the first nearness criteria is a radius.

13. The computer program product of claim 8, wherein each candidate term identifies common metadata from the first category of terms and the second category of terms.

14. A computer implemented method for identifying linguistically related elements upon activation by an artificial intelligence platform, the method comprising:
applying a linguistic algorithm to a corpus and form a cluster representation of entries in the corpus;
identifying a first linguistic term within a first category of terms and applying the first linguistic term to the cluster representation, applying a first nearness criteria, and returning a first group of candidate linguistic terms proximal to the applied first linguistic term;
refining the first group of candidate linguistic terms, including for each candidate linguistic term iteratively identifying:
a first associative relationship with first metadata of the first category of terms; and
a second associative relationship with second metadata of a second category of terms, wherein the first category is semantically related to the second category; and
selectively removing one or more candidate linguistic terms from the first group that do not meet both the first and second associative relationships; and
forming a second group from the iterative identification, including selectively remove one or more linguistic terms from the first group, the second group having a membership limited to the linguistic terms in the group having both the first associative relationship with the first metadata of the first category of terms and the second associative relationship with the second metadata of the second category of terms.

15. The method of claim 14, wherein the first associative relationship with the first metadata is limited to first categorically related data and excludes a first compilation of terms associated with the first linguistic term.

16. The method of claim 14, wherein the second associative relationship with the second metadata includes data categorically related to the second metadata and excludes a second compilation of terms associated with the first linguistic term.

17. The method of claim 14, further comprising dynamically applying a second linguistic term to the cluster representation responsive to a detected change in a composition of the corpus.

18. The method of claim 14, wherein the cluster representation includes a vector representation of entries of the corpus, and the first nearness criteria is a radius.

19. The method of claim 14, wherein the first associative relationship with the first metadata is first categorically related data, the second associative relationship with the second metadata is second categorically related data, and the first and second categories are semantically related.

20. The method of claim 14, wherein each candidate term identifies common metadata from the first category of terms and the second category of terms.

* * * * *